Feb. 27, 1951     C. P. REGENSBURG     2,543,670
TRANSPARENCY VIEWER
Filed Feb. 18, 1947
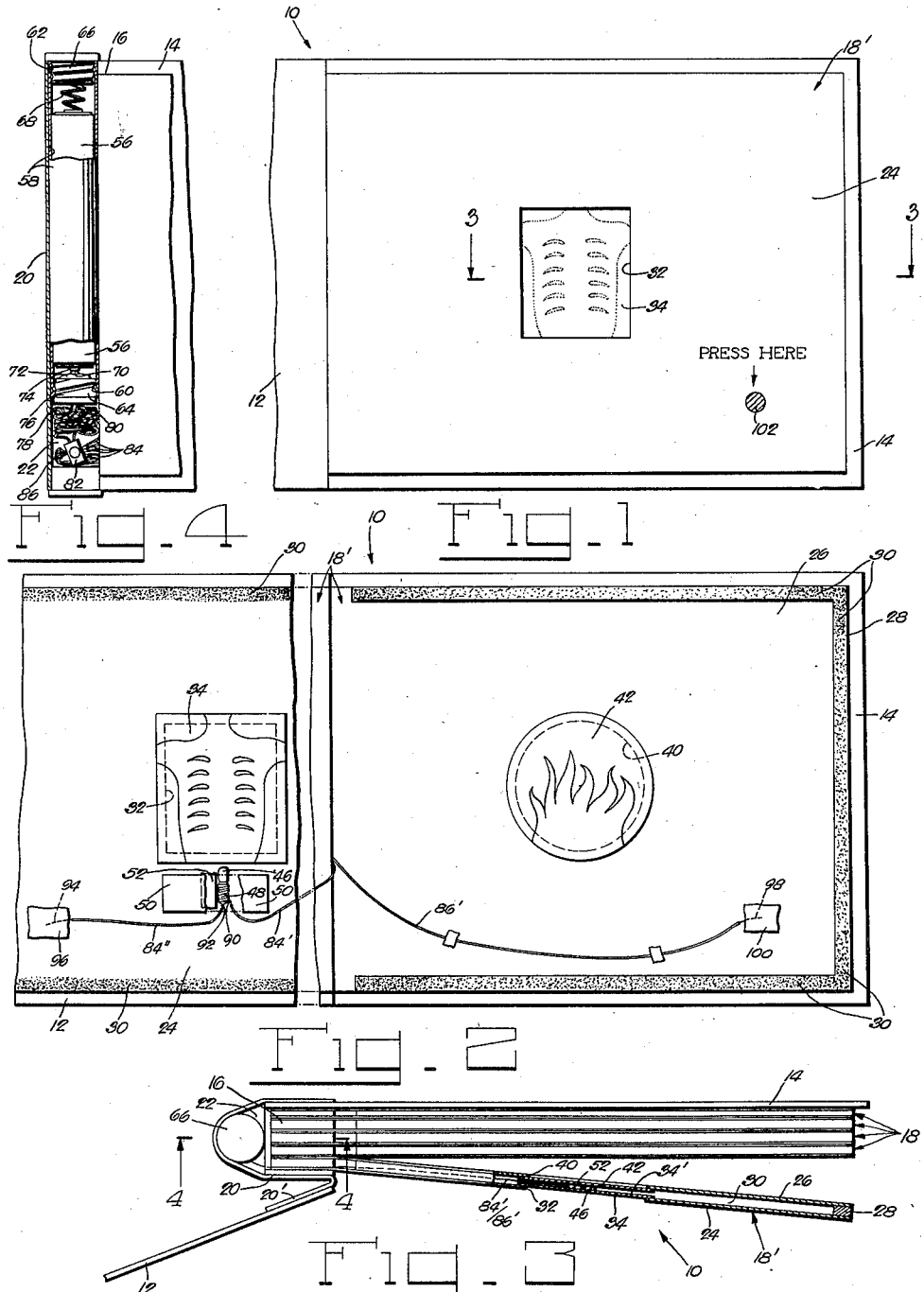
INVENTOR
CHARLES P. REGENSBURG
BY Edwin Leusohn
ATTORNEY Patented Feb. 27, 1951

2,543,670

UNITED STATES PATENT OFFICE 2,543,670

TRANSPARENCY VIEWER

Charles P. Regensburg, New York, N. Y.

Application February 18, 1947, Serial No. 729,221

4 Claims. (Cl. 40—130)

This invention relates to novelty books, and more particularly to illuminated transparency viewers in book form.

It is the primary aim and object of the present invention to provide a book, the pages of which hold transparencies that may individually be rendered legible for viewing purposes by concealed illumination.

It is another object of the present invention to provide the book with a contained illumination source and also with individual manual controls for the illumination of the transparency or transparencies on each page.

The above and other objects, features and advantages of the present invention will be more fully understood from the following description considered in connection with the accompanying illustrative drawings.

In the drawings:

Fig. 1 is a fragmentary front view of an open book embodying the present invention;

Fig. 2 is a view similar to Fig. 1, and shows one of the pages of the book partly disassembled to disclose its construction;

Fig. 3 is an edge view, partly in section, of the book, the section thereof being taken on the line 3—3 of Fig. 1; and Fig. 4 is a fragmentary section taken on the line 4—4 of Fig. 3.

Referring to the drawings, the reference numeral 10 designates a book, having the usual front and rear covers 12 and 14, respectively, back 16, and a plurality of specially constructed pages 18 which are conventionally bound in the back 16 of the book. A liner 20 of any suitable strong and flexible material is suitably attached, as by cementing, for instance, to the back 16 of the book, in such fashion that it forms an open end pocket 22 which extends alongside the back 16 (Fig. 3). The front cover 12 of the book is preferably attached, as by cementing, for instance, to an extension 20' of the flexible liner 20, so as to be turnable into open and closed positions.

Since the pages 18 of the book are identical in construction, only one will be described in detail with reference to Figs. 2 and 3. The page 18' comprises front and back sheets 24 and 26, respectively, of relatively strong, yet flexible, paper or the like, which are held in spaced parallel relation with each other by an interposed U-shaped spacer 28 of any suitable material, such as cardboard, for instance, so as to provide a gap 30 between the sheets 24 and 26. The parallel legs of the U-shaped spacer 28 terminate preferably short of the back 16 of the book so as to leave the portions of the sheets 24 and 26 between the back 16 and the spacer 28 free to flex and permit turning of the page over against the top cover 12. The margins of the sheets 24 and 26 are preferably permanently attached to the interposed spacer 28 as by cementing at 30, for instance. The front sheet 24 has a cut-out window opening 32 in which is exposed a transparency 34 that may be attached with its margins to the inner face of the sheet 24 by cementing or in any other suitable manner. The transparency bears on its inner or non-exposed face 34' any desired depiction, such as a picture, which is ordinarily illegible, or only faintly legible on the exposed face of the transparency. Thus, the ordinary contrast in the legibility of the picture on the inner and outer faces of the transparency may, for instance, be as represented in Figs. 1 and 2, of which Fig. 1 shows the picture faintly at the exposed face of the transparency, and Fig. 2 shows the same picture clearly outlined at the inner face of the transparency. The back sheet 26 may, if desired, be also provided with a cut-out window opening 40 of any desired shape for the display of another transparency 42, which may be cemented or otherwise attached with its margins to the inner face of the back sheet 26. Like the transparency 34, the transparency 42 bears on its inner face any desired depiction that ordinarily is illegible, or only faintly legible, on the exposed face of the transparency.

The transparencies 34 and 42 of page 18' depict, in the present instance, a human chest X-ray and flames, respectively, while the transparencies of the other pages may bear any other depictions. Also, the portions of the sheets surrounding the exposed transparencies thereon may bear any suitable explanatory or instructive printing, or pictures which harmonize with, or form parts of, the respective transparencies.

The present invention also contemplates illumination of each transparency so as to render the same clearly legible at the exposed face thereof. To this end, there is provided in the gap 30 between the front and back sheets 24, 26 of each page 18 a small-size electric light bulb 46 which is preferably mounted in a conventional metallic socket 48 (Fig. 2) that is conveniently held against one of the opposite sheets 24 or 26, and preferably against the front sheet 24, by means of a strip 50 of paper or the like, that may be cemented to the sheet 24 in the manner shown in Fig. 2. In order to protect the light bulb 46 against breakage on pressing the page thereat accidentally, there is preferably placed alongside the light bulb 46 and its socket 48 a spacer 52 which is conveniently held in place by the same strip 50. As shown in Fig. 2, the light bulb 46 is located in close proximity to, but outside the confines of, the window openings 32 and 40 in the front and back sheets 24 and 26, respectively, so that the light bulb 46 is well concealed in the closed page (Fig. 1), yet its light will flood the entire region of the transparencies at their inner faces, and thereby render them clearly legible at their exposed faces.

The present book also contains, in a concealed fashion, an electrical source for lighting the bulb in any page of the book. This electrical source is, in the present instance, in the form of one or more small-size batteries 56 which are removably mounted in a metallic shell 58 (Fig. 4) that resembles, in construction and function, the housing of a flashlight. The opposite open ends of the shell 58 have preferably impressed threads 60 and 62, respectively, for the reception of contact plug 64 and a spring retainer plug 66, respectively. The retainer plug 66 is of any suitable insulating material and serves to retain in the shell 58 a spring 68 that normally urges the batteries 56 into engagement with the contact plug 64. The contact plug 64 has a central contact point 70 which is engaged by the contact point 72 of the adjacent battery 56, and is insulated at 74 from the metallic sleeve 76 of the plug 64 which is threaded into the metallic shell 58. Emerging from the contact plug 64 are two insulated wires 78 and 80 of which the adjacent bare end of wire 78 is permanently connected with the metallic sleeve 76, while the adjacent bare end of wire 80 is connected with the contact point 70 of the plug 64. The other bare ends of the wires 78 and 80 are suitably connected in a terminal block 82 with series of wires 84 and 86, respectively. As shown in Fig. 4, the battery holding shell 58 and the terminal block 82 are located in the back pocket 22 of the book. The back pocket 22 is preferably of such transverse expanse as snugly to receive the shell 58 for removal therefrom whenever it is necessary to replace a battery or batteries. In order to permit the removal of the shell 58 from the back pocket 22 for battery replacement purposes, for instance, without disturbing the terminal block 82 in the back pocket, the wires 78 and 80 are made accordingly long. A pair of each of the wires 84 and 86 serves to connect the light bulb in each page with the batteries 56 by way of the terminal block 82 and the wires 78 and 80. Thus, the wires 84' and 86' in the page 18' (Fig. 2) serve to connect the light bulb 46 therein with the wires 78 and 80. More particularly, the wire 84', coming from the terminal block 82, may be electrically connected at 90 with the metallic socket 48, as by soldering, for instance. A separate length of wire 84" is suitably electrically connected with one end, as by soldering, with contact point 92 of the socket 48, while the other bare end 94 thereof is in contact with a piece 96 of any suitable conductive foil which is preferably cemented to the adjacent front sheet 24 in overlapping and contacting relation with the bare wire end 94. The other wire 86', coming from the terminal block 82, has its bare end 98 in contact with another piece 100 of conductive metal foil which is preferably cemented to the adjacent back sheet 26 in overlapping and contacting relation with the bare wire end 98. The conductive foils 96 and 100 are, in the normal superposed relation of the sheets 24 and 26 of the closed page 18' opposite to each other and serve as a normally open switch which is closed on pressing or squeezing the page 18' in the vicinity of the foils 96, 100. The "switch" 96, 100 is thus entirely concealed from view. In order to enable the user of the book to close the switch, there is preferably provided on the front sheet 24, for instance, any suitable marking, such as a colored circle 102, and suitable legend like "Press Here," for instance, so that the switch will be closed when the page is pressed at, or in the vicinity of, the circle 102. The circuit through the light bulb 46 is, on closure of the switch 96 and 100, closed by way of the batteries 56, contact point 70 of plug 64 and wire 78 connected therewith, wire 84', the metallic socket 48, light bulb 46, wire 84" which connects the contact point 92 of the socket 48 with the metal foil 96, thence the closed switch 96 and 100, then wire 86', which is connected with the metallic sleeve 76 of the contact plug 64 by wire 80, and finally the metallic shell 58.

The wiring and the switch arrangement therefor are exactly the same in the other pages. Thus, the light bulb in each page 18 may be illuminated for the legible display of the transparency or transparencies thereon, by simply squeezing the page at the marked spot, as explained in connection with page 18'.

The transparencies may depict any conceivable subject, and may be either of a constructive or a comical nature, depending on whether the book is intended for instructive purposes or as a mere toy for children. The present book is also well suited as a picture album holding photographic transparencies, particularly of the portrait type.

While I have shown and described the preferred embodiment of my invention, it will be understood that various changes may be made in the present invention without departing from the underlying idea or principles of the invention within the scope of the appended claims.

Having thus described my invention, what I claim and desire to secure by Letters Patent, is:

1. A viewer comprising a frame having a front panel with a window and a back panel spaced from said front panel, at least one of said panels being resiliently flexible, and electric lighting means between said panels including a light bulb for illuminating said window and a normally open switch which is closed on flexing said one panel thereagainst.

2. Transparency viewer comprising, a frame having a front panel with a window and a back panel spaced from said front panel, at least one of said panels being resiliently flexible, a transparency attached to said front panel for display in said window, and electric lighting means between said panels including a normally open switch having companion contact parts carried by said panels, respectively, in normally spaced relation to each other, said contact parts being conductively engaged on flexing said one panel against the other panel.

3. Transparency viewer comprising, a plurality of frames hingedly connected on one side in bookleaf fashion, each frame having a front panel with a window and a back panel spaced from said front panel, at least one of said panels being resiliently flexible, a transparency attached to the front panel of each frame for display in the window thereof, a pocket-forming back on the hingedly connected sides of said frames, individual illumination means for said transparencies, comprising in each frame between the panels thereof a light bulb, a normally open switch which is closed on flexing said one panel of the frame against the other panel thereof, and wiring connecting said bulb and switch and extending into said back, and a battery in said back to which said wiring is connected so that any bulb lights on closing the coordinated switch.

4. Transparency viewer in book form comprising, front and back covers, a back joining said covers, a plurality of pages between said covers so bound in book-leaf fashion in said back as to leave a pocket in the latter, each page having a front panel with a window and a rear panel held marginally spaced from said front panel, one of the panels of each page being resiliently flexible, a transparency attached to the front panel of each page for display in the window thereof, and individual illumination means for said transparencies, comprising in each page between the panels thereof a light bulb, a normally open switch which is closed on flexing said one panel of the page against the opposite panel thereof, and wiring connecting said bulb and switch and extending into said pocket in the back, and a battery in said pocket with which said wiring is connected so that any bulb lights on closing the coordinated switch.

CHARLES P. REGENSBURG.

REFERENCES CITED

The following references are of record in the file of this patent:

UNITED STATES PATENTS

| Number | Name | Date |
|---|---|---|
| 1,403,788 | Jones | Jan. 17, 1922 |
| 1,686,457 | McClintock | Oct. 2, 1928 |
| 1,961,865 | Remington | June 5, 1934 |
| 2,298,754 | Davis | Oct. 13, 1942 |

FOREIGN PATENTS

| Number | Country | Date |
|---|---|---|
| 835,316 | France | Mar. 16, 1938 |
| 231,872 | Germany | Mar. 2, 1911 |